United States Patent
Watanabe

(10) Patent No.: US 8,634,003 B2
(45) Date of Patent: Jan. 21, 2014

(54) IMAGE SENSING APPARATUS THAT ESTIMATES DARK CURRENT AND CONTROL METHOD THEREFOR

(75) Inventor: Shinobu Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 12/938,795

(22) Filed: Nov. 3, 2010

(65) Prior Publication Data
US 2011/0115952 A1 May 19, 2011

(30) Foreign Application Priority Data
Nov. 13, 2009 (JP) .................... 2009-260452

(51) Int. Cl.
*H04N 9/64* (2006.01)
(52) U.S. Cl.
USPC ........................................ 348/243
(58) Field of Classification Search
USPC .................................. 348/241, 243
See application file for complete search history.

(56) References Cited

U.S. PATENT DOCUMENTS

| | | | |
|---|---|---|---|
| 7,570,287 B2 * | 8/2009 | Tsuruoka ................. | 348/241 |
| 7,586,526 B2 * | 9/2009 | Kurokawa et al. ........ | 348/314 |
| 8,243,174 B2 * | 8/2012 | Ichikawa ................. | 348/246 |
| 2004/0212703 A1 * | 10/2004 | Sugimoto et al. ......... | 348/241 |
| 2008/0031537 A1 * | 2/2008 | Gutkowicz-Krusin et al. ....................... | 382/254 |

FOREIGN PATENT DOCUMENTS

| | | | |
|---|---|---|---|
| JP | 2005341261 A | * | 12/2005 |
| JP | 2006-094474 A | | 4/2006 |
| JP | 2007-027864 | | 2/2007 |
| JP | 2008-022486 A | | 1/2008 |
| JP | 2009-124421 A | | 6/2009 |

* cited by examiner

*Primary Examiner* — Gary C Vieaux
(74) *Attorney, Agent, or Firm* — Cowan, Liebowitz & Latman, P.C.

(57) ABSTRACT

An image sensing apparatus comprises an image sensor configured to convert an optical image of a subject into image signals by photoelectric conversion. The image sensing apparatus acquires information for estimating a magnitude of a dark current in the image sensor, and, on the basis of the acquired information, selects any one of vertical linear noise correction processing, black subtraction processing, and normal readout processing in which neither the vertical linear noise correction processing or the black subtraction processing is carried out. Then, the image sensing apparatus carries out the vertical linear noise correction processing to correct a vertical linear noise in an image if the vertical linear noise correction processing is selected, or the black subtraction processing to correct a vertical linear noise and a fixed pattern noise in an image if the black subtraction processing is selected.

8 Claims, 11 Drawing Sheets

SENSITIVITY : A < A1

| TEMPERATURE : t \ SHUTTER SPEED : s | s < S1 | S1 ≤ s ≤ S2 | S2 < s |
|---|---|---|---|
| t < T1 | NORMAL READOUT | NORMAL READOUT | BLACK SUBTRACTION |
| T1 ≤ t ≤ T2 | VERTICAL LINEAR NOISE CORRECTION | VERTICAL LINEAR NOISE CORRECTION | BLACK SUBTRACTION |
| T2 < t | VERTICAL LINEAR NOISE CORRECTION | BLACK SUBTRACTION | BLACK SUBTRACTION |

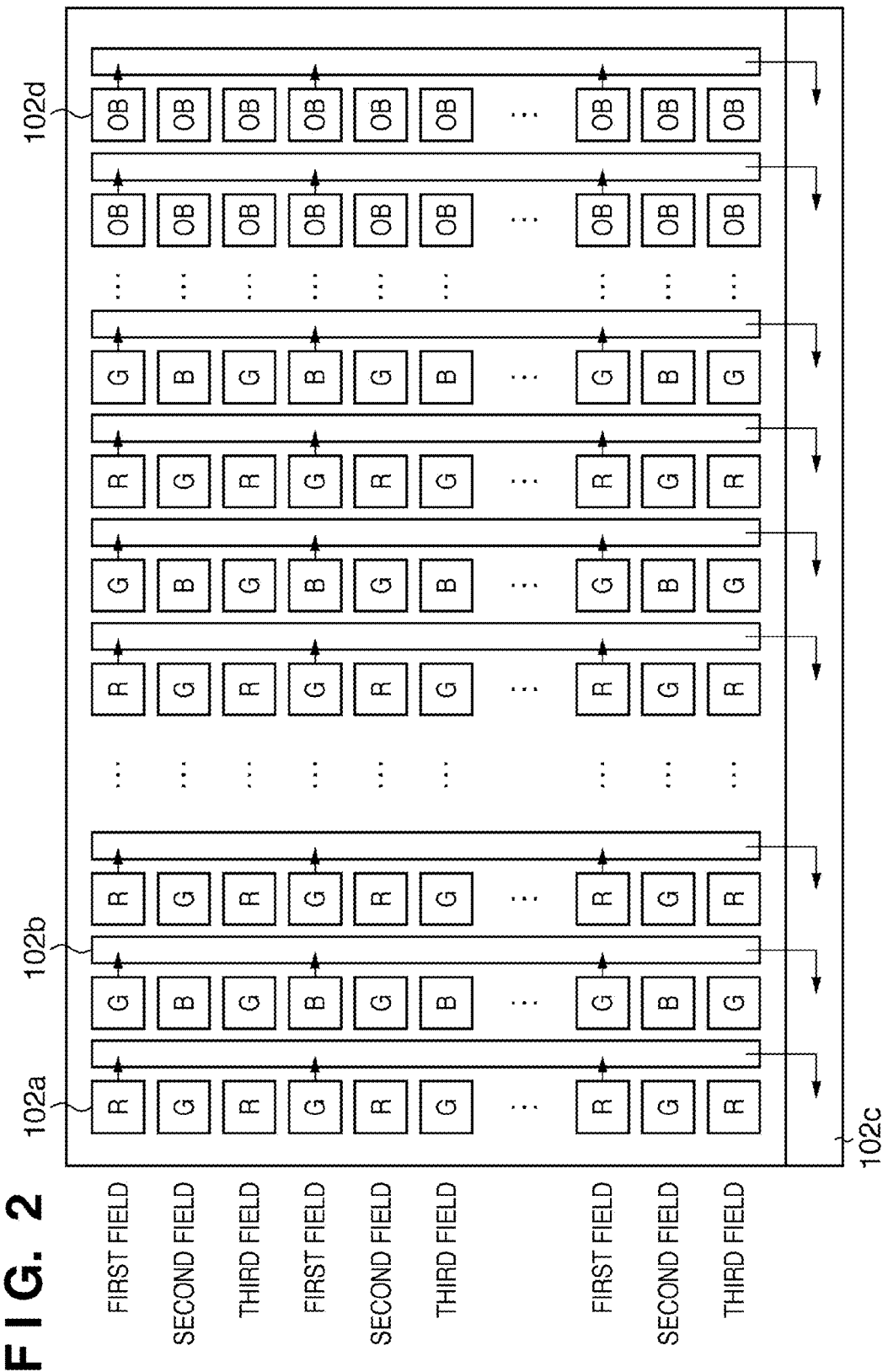

FIG. 3A

SENSITIVITY: A < A1

| SHUTTER SPEED: s  TEMPERATURE: t | s < S1 | S1 ≤ s ≤ S2 | S2 < s |
|---|---|---|---|
| t < T1 | NORMAL READOUT | NORMAL READOUT | BLACK SUBTRACTION |
| T1 ≤ t ≤ T2 | VERTICAL LINEAR NOISE CORRECTION | VERTICAL LINEAR NOISE CORRECTION | BLACK SUBTRACTION |
| T2 < t | VERTICAL LINEAR NOISE CORRECTION | BLACK SUBTRACTION | BLACK SUBTRACTION |

FIG. 3B

SENSITIVITY: A1 ≤ A

| SHUTTER SPEED: s  TEMPERATURE: t | s < S1 | S1 ≤ s ≤ S2 | S2 < s |
|---|---|---|---|
| t < T1 | NORMAL READOUT | BLACK SUBTRACTION | BLACK SUBTRACTION |
| T1 ≤ t ≤ T2 | VERTICAL LINEAR NOISE CORRECTION | BLACK SUBTRACTION | BLACK SUBTRACTION |
| T2 < t | VERTICAL LINEAR NOISE CORRECTION | BLACK SUBTRACTION | BLACK SUBTRACTION |

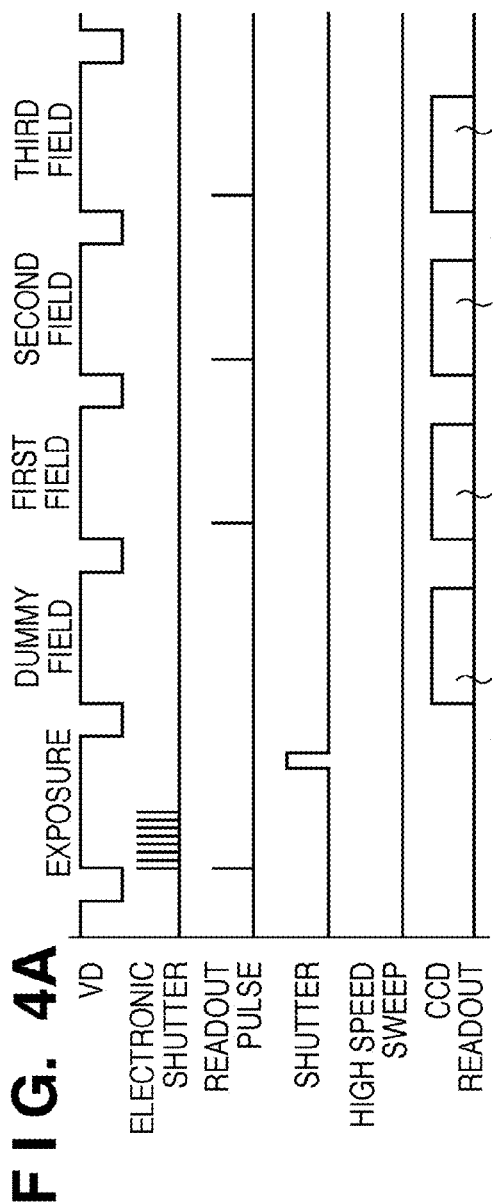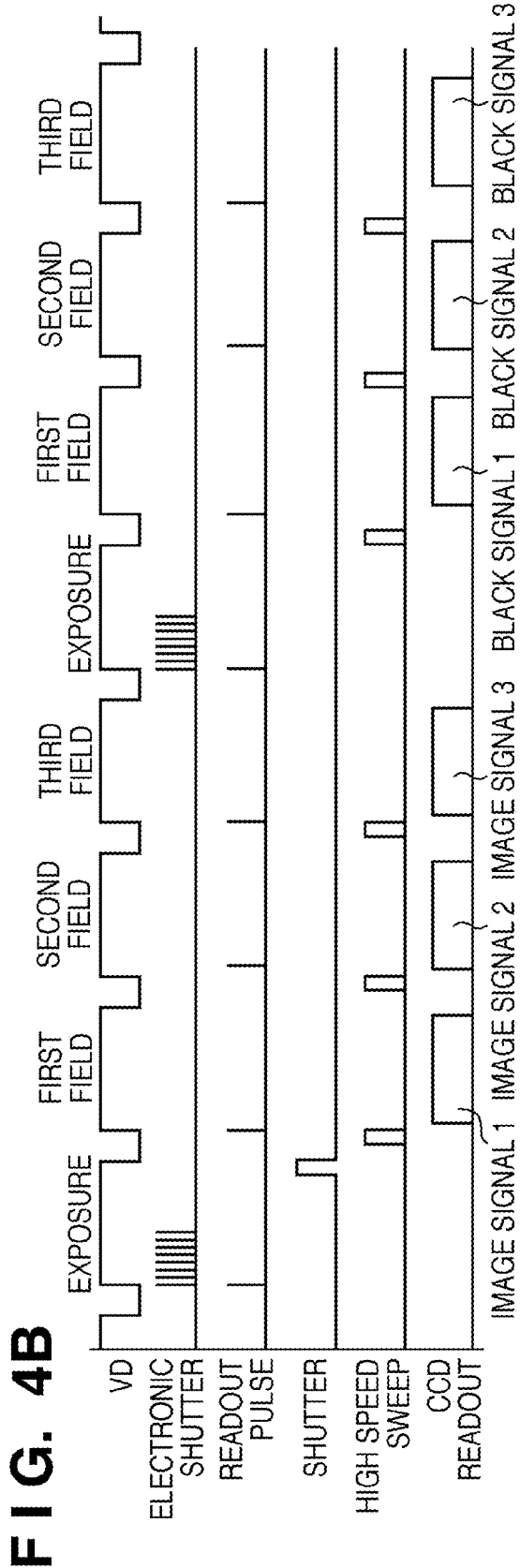
FIG. 4A
FIG. 4B

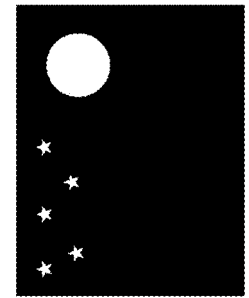
FIG. 5A
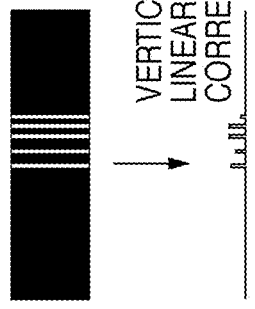
FIG. 5B
FIRST FIELD  SECOND FIELD  THIRD FIELD
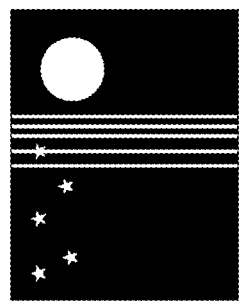
FIG. 5C
DUMMY IMAGE
FIG. 5D
VERTICAL LINEAR NOISE CORRECTION VALUE
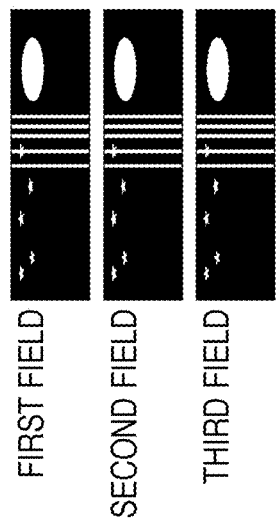
FIG. 5E

IMAGE SENSING APPARATUS THAT ESTIMATES DARK CURRENT AND CONTROL METHOD THEREFOR

BACKGROUND OF THE INVENTION

1. Field of the Invention

The present invention relates to an image sensing apparatus and a method for controlling the image sensing apparatus, and more particularly, relates to a technique for reducing a vertical linear noise in an image sensing apparatus and a method for controlling the image sensing apparatus.

2. Description of the Related Art

Conventionally, in CCD image sensors in which high speed sweep is carried out for sweeping unnecessary charge for each readout field, vertical linear noises which have a difference in level between the top and bottom of the screen may be caused as shown in FIG. 11A.

As an image sensing apparatus and a method for reducing vertical linear noises caused in these CCD image sensors, a technique is known which is described in Japanese Patent Application Laid-Open No. 2007-27864. Japanese Patent Application Laid-Open No. 2007-27864 discloses the storage of image data (FIG. 11B) into a memory, which is obtained by carrying out readout after the completion of exposure without transfer of charge from a light receiving element to a transfer unit, and then the reduction of vertical linear noises through the subtraction from image data obtained by transferring the charge from the light receiving element to the transfer unit and carrying out readout (FIG. 11C).

However, in accordance with the method disclosed in Japanese Patent Application Laid-Open No. 2007-27864, although vertical linear noises can be corrected the subtraction processing is carried out for all of the pixels. Thus, the subtraction processing is carried out even for pixels which require no subtraction processing, thereby degrading the S/N ratio.

SUMMARY OF THE INVENTION

The present invention has been made in consideration of the above situation, and reduces vertical linear noise without degrading picture quality.

According to the present invention, provided is an image sensing apparatus comprising: an image sensor configured to convert an optical image of a subject into image signals by photoelectric conversion, the image sensor comprising a plurality of pixels two-dimensionally arranged, a vertical transfer unit for transferring, in a vertical direction, image signals from the plurality of pixels, and a horizontal transfer unit for transferring, in a horizontal direction, image signals transferred in the vertical direction from the vertical transfer unit; a vertical linear noise correction unit configured to carry out vertical linear noise correction processing for the image signals; a black subtraction processing unit configured to carry out black subtraction processing for the image signals; and a control unit configured to exercise control in such a way that information is acquired for estimating a magnitude of a dark current in the image sensor; any one of the vertical linear noise correction processing, the black subtraction processing, and normal readout processing in which neither the vertical linear noise correction processing or the black subtraction processing is carried out, is selected on the basis of the acquired information; and the vertical linear noise correction unit carries out the vertical linear noise correction processing to correct a vertical linear noise in an image in the case of selecting the vertical linear noise correction processing, or the black subtraction processing unit carries out the black subtraction processing to correct a vertical linear noise and a fixed pattern noise in an image in the case of selecting the black subtraction processing.

According to the present invention, provided is a method for controlling an image sensing apparatus comprising an image sensor configured to convert an optical image of a subject into image signals by photoelectric conversion, the image sensor comprising a plurality of pixels two-dimensionally arranged, a vertical transfer unit for transferring, in a vertical direction, image signals from the plurality of pixels, and a horizontal transfer unit for transferring, in a horizontal direction, image signals transferred in the vertical direction from the vertical transfer unit, the method comprising: an acquisition step of acquiring information for estimating a magnitude of a dark current in the image sensor; a selection step of selecting, on the basis of the acquired information, any one of vertical linear noise correction processing, black subtraction processing, and normal readout processing in which neither the vertical linear noise correction processing or the black subtraction processing is carried out; a vertical linear noise correction processing step of carrying out the vertical linear noise correction processing to correct a vertical linear noise in an image if the vertical linear noise correction processing is selected in the selection step; and a black subtraction processing step of carrying out the black subtraction processing to correct a vertical linear noise and a fixed pattern noise in an image if the black subtraction processing is selected in the selection step.

Further features of the present invention will become apparent from the following description of exemplary embodiments with reference to the attached drawings.

BRIEF DESCRIPTION OF THE DRAWINGS

FIG. 2 is a diagram illustrating a structure example of an image sensor (CCD) for use in an image sensing apparatus according to the present invention;

FIGS. 3A and 3B are diagrams showing correction selecting tables according to the first embodiment;

FIGS. 4A and 4B are timing charts showing readout timings of image signals according to the first embodiment;

FIGS. 5A to 5E are diagrams illustrating images before and after applying a correction method according to the present invention;

DESCRIPTION OF THE EMBODIMENTS

Preferred embodiments of the present invention will be described in detail in accordance with the accompanying drawings.

<First Embodiment>

Figure 1:
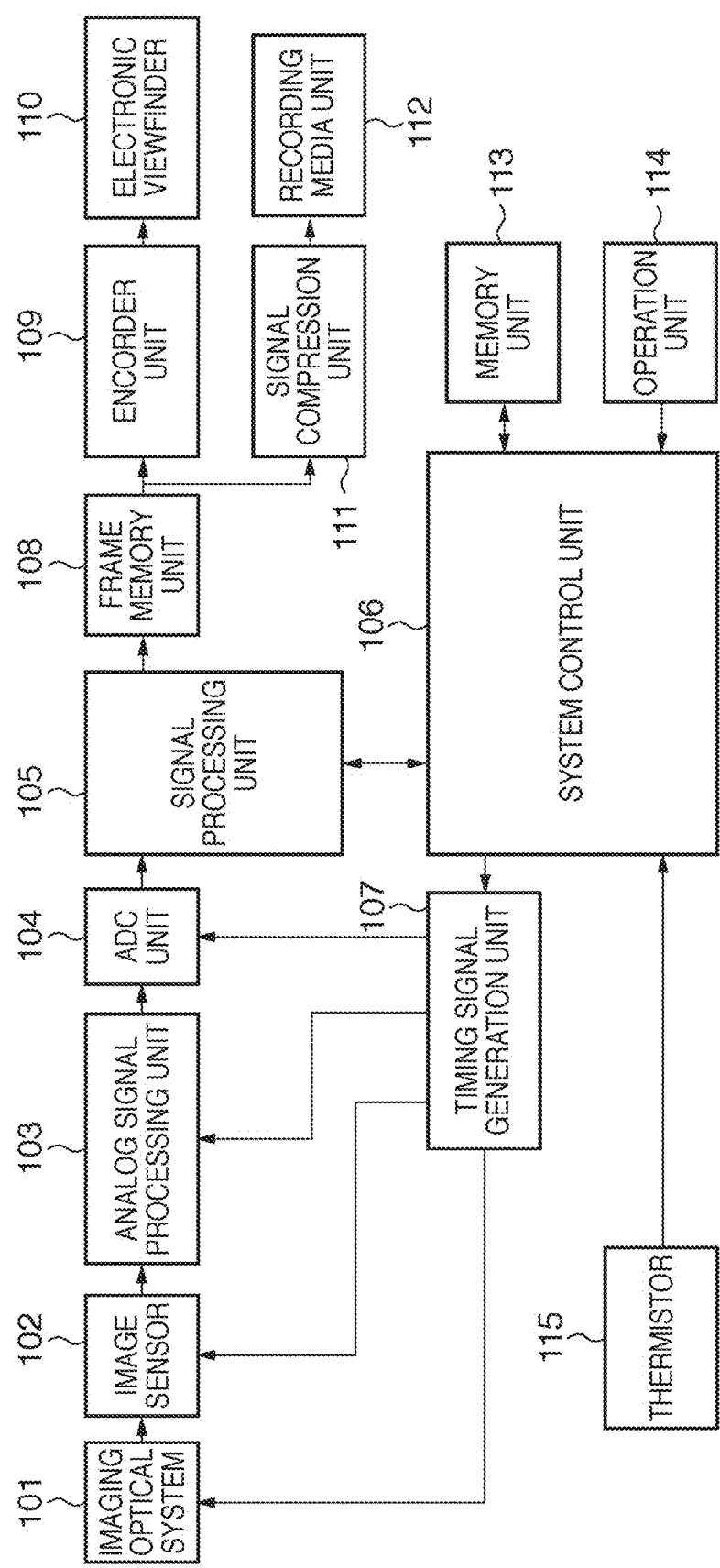
FIG. 1 is a block diagram illustrating the configuration of an image sensing apparatus according to a first embodiment of the present invention.

FIG. 1 is a block diagram illustrating the configuration of a digital camera as an example of an image sensing apparatus according to a first embodiment of the present invention.

In FIG. 1, reference numeral 101 denotes an imaging optical system including a lens and a mechanical shutter which functions as an aperture, which forms an incident optical image of a subject onto an image sensor 102. The image sensor 102 converts the formed optical image of the subject into electrical signals by photoelectric conversion.

An analog signal processing unit 103 applies processing such as correlated double sampling to output signals from the image sensor 102 and outputs analog image signals. An analog/digital conversion unit (ADC unit) 104 converts the analog image signals output from the analog signal processing unit 103, into digital image signals. A signal processing unit 105 applies image processing such as white balance adjustment, γ correction, and pixel interpolation to the digital image signals output from the ADC unit 104.

A frame memory unit 108 is a memory for temporarily storing digital image signals, and composed of, for example, a DRAM. A signal compression unit 111 compresses the digital image signals stored in the frame memory unit 108 in accordance with an approach such as JPEG (Joint Photographic Experts Group). The operation for compression is started in response to a release operation for shooting. A recording media unit 112 is provided to store the compressed digital image signals, and composed of, for example, a flash memory.

An encoder unit 109 converts the digital image signals stored in the frame memory unit 108 into suitable image signals for display such as in NTSC standards or PAL standards. Then, an electronic viewfinder 110 is a display unit for displaying image signals converted by the encoder unit 109.

A system control unit 106 controls each unit of the digital camera. In addition, the system control unit 106 determines the operation mode of the digital camera on the basis of an instruction from an operator, and retrieves information corresponding to the determined operation mode from the memory unit 113.

A thermistor 115 measures a temperature around the image sensor 102 and passes along the measured temperature to the system control unit 106. A timing signal generation unit 107 outputs timing signals for driving to the image sensor 102, the analog signal processing unit 103, and the ADC unit 104. Various types of timing signals output from the timing signal generation unit 107 are based on a reference clock signal supplied from the system control unit 106.

An operation unit 114 is operated when a user activates the digital camera, and changes information on system settings of the digital camera such as exposure conditions, zoom factors, and driving modes. Then, the operation unit 114 inputs, every time information regarding change in information on system settings of the digital camera is input from a user, the information on the change to the system control unit 106. The operation unit 114 includes, for example, a power switch, a shutter button, a mode switching switch, a group of operation inputs, etc.

FIG. 2 is a diagram illustrating a structure example of a CCD for use as the image sensor 102. As shown in FIG. 2, the image sensor 102 (CCD) has a large number of pixels 102a arranged in a two-dimensional matrix shape. Further, the image sensor 102 is configured in such a way that vertical transfer CCDs 102b for transferring signal charges from the pixels 102a in a vertical direction are arranged between columns of the pixels 102a. In this example, these pixels are arranged in a so-called Bayer arrangement in which lines of R (red) pixels and G (green) pixels lined up and lines of G (green) pixels and B (blue) pixels lined up are arranged alternately in a horizontal direction. In addition, reference numeral 102d denotes an OB (optical black) pixel shielded from light, which output charge signals which are independent of incident light.

In this first embodiment, it is assumed that image signal readout from the pixels in this arrangement is carried out in accordance with 3-field readout. In the case of the 3-field readout, image signals of the first-row, fourth-row, seventh-row, . . . pixels are transferred to the vertical transfer CCDs 102b and read out in the first field, and signals of the second-row, fifth-row, eighth-row, . . . pixels are read out in the same way in the next second field. Furthermore, signals of the third-row, sixth-row, ninth-row, . . . pixels are read out in the third field. It is to be noted that signal charges transferred to the vertical transfer CCDs 102b are transferred in the vertical direction by the vertical transfer CCDs 102b, then transferred in the horizontal direction by a horizontal transfer CCD 102c, and transmitted to an amplifier (not shown) at a subsequent stage.

This read out is carried out in this first embodiment for the following reasons. More specifically, this is because signals of vertically adjacent pixels cause color mixture in the vertical transfer CCDs 102b when signals of all of the pixels are transferred to the vertical transfer CCDs 102b at a time, since recent image sensors has quite a number of pixels which are close to each other. In addition, the readout is carried out for every three rows, because signals of all of the three colors R, G, and B are contained in the same field when signals of, for example, the first-row and fourth-row pixels are read out in the same field.

It is to be noted that the present invention is not to be considered limited to the 3-field readout, and the division into multiple fields other than three fields may be carried out for readout, or frame readout may be carried out without the division into fields.

Next, processing according to the first embodiment in the digital camera configured as described above will be described. On the basis of information such as the temperature (T) of the image sensor 102, the shutter speed (s), and the sensitivity (A) (shooting sensitivity), the magnitude of dark current (dark current value) can be estimated. Accordingly, any one of normal readout processing, vertical linear noise correction processing, and black subtraction processing is selected on the basis of these values.

The magnitude of dark current (dark current value) generated in the vertical transfer CCDs 102b depends on the sensitivity and the temperature, and the dark current is increased with increase in sensitivity or temperature. In addition, the magnitude of dark current (dark current value) generated in the pixels depends on the sensitivity, the temperature, and the shutter speed, and the dark current is increased when the sensitivity is higher, the temperature is higher, or the shutter speed is slower. Therefore, the normal readout processing will be carried out when the shutter speed is fast at low temperatures, the vertical linear noise correction processing will be carried out when the shutter speed is fast at high temperatures, and the black subtraction processing will be carried out when the shutter speed is slow at low or high temperatures.

Thus, on the basis of the information such as the temperature (T) of the image sensor 102, the shutter speed (s), and the sensitivity (A), the dark current value X is estimated, and the vertical linear noise correction processing is started under the condition that the dark current value X is greater than a dark current value X1 at which a vertical linear noise mainly caused by the dark current component of the vertical transfer CCD 102b starts to appear on the image.

In addition, the black subtraction processing is started under the condition that the estimated dark current value X is greater than a dark current value X2 at which both a vertical linear noise mainly caused by the dark current component of the vertical transfer CCD 102b of the image sensor 102 and a fixed pattern noise mainly caused by the dark current component of the pixels 102a start to appear on the image.

In this case, the dark current value X1 at which a vertical linear noise starts to appear and the dark current value X2 at which a fixed pattern noise starts to appear have a magnitude relation of X1<X2 normally.

FIGS. 3A and 3B are tables showing an example of correction selecting tables in the first embodiment, which is held in, for example, an internal memory of the system control unit 106. The correction selecting tables refer to tables for relating the three parameters of the temperature (T), the shutter speed (s), and the sensitivity (A) to the three types (contents) of processing of the normal readout processing, the vertical linear noise correction processing, and the black subtraction processing, as shown in FIGS. 3A and 3B. The example of the correction selecting tables shown in FIGS. 3A and 3B are composed of two tables separated by the value of the sensitivity (A), and FIGS. 3A and 3B respectively show cases of low sensitivity and high sensitivity. In addition, in the correction selecting table shown in FIGS. 3A and 3B, a dashed line indicates a boundary of the dark current value X1, whereas a bold line indicates a boundary of the dark current value X2.

From the characteristics of the dark current components, the sensitivity A1, temperatures T1, T2, and shutter speeds S1, S2 are each determined in advance depending on the boundary for determining which correction is required.

The black subtraction processing herein refers to processing of accumulating charge with the shutter closed for the same period as the exposure period for a main image of the image sensor 102 and subtracting a dark current component (black image) obtained as a result of this accumulation from signals of the main image. The execution of this processing can reduce the dark current component from the signals of the main image to reduce fixed pattern noises due to dark current. In addition, the execution of this black subtraction processing also subtracts a signal component of a vertical linear noise from the signals of the main image as will hereinafter be described in detail, and thus eliminates the need to carry out the vertical linear noise correction processing.

However, in the case of carrying out the black subtraction processing, it is necessary to acquire a black image by accumulating charges for the same charge accumulation period as in the case of main shooting, thus resulting in longer processing time. In addition, when the black image is subtracted from the main image, fixed pattern noises caused on a pixel to pixel basis are reduced, while random noise components caused on a pixel to pixel basis are adversely increased to degrade the S/N ratio. Therefore, in the case of only a vertical linear noise caused, the vertical linear noise correction processing is desirably carried out, rather than the black subtraction processing.

Now, the vertical linear noise correction processing and the black subtraction processing will be described with reference to FIGS. 4A through 5E. In FIGS. 4A and 4B, VD indicates a vertical synchronizing signal. First, the vertical linear noise correction processing will be described.

FIG. 4A shows a timing chart in the case of the vertical linear noise correction processing being performed in the first embodiment. First, for an exposure period, accumulated charge in the image sensor 102 is cleared by an electronic shutter after the output of a readout pulse, and main exposure is started. Then, after a lapse of a predetermined period of time, depending on the shutter speed of the mechanical shutter of the imaging optical system 101, a pulse for closing the shutter is output to close the mechanical shutter, thereby completing the exposure for the image sensor 102.

After that, while image signals in a first field are read out in the case of normal readout processing, empty transfer images without any pixel information in the image sensor 102 are read out without outputting a readout pulse before reading out image signals in a first field in the case of the vertical linear noise correction processing. Hereinafter, the thus read out empty transfer images are referred to as "dummy images", and the field for reading out the dummy images is referred to as a "dummy field". Since vertical linear noises are caused in the vertical transfer CCDs 102b even when no image signals from the pixels are transferred, the dummy images lead to images with vertical linear noises caused, and can be thus used as images for correcting vertical linear noises. In addition, in the first embodiment, in order to make a vertical liner noise component uniform on the top and bottom of the screen, high speed sweep before reading out image signals is stopped when the vertical linear noise correction is selected.

After the dummy images are retrieved in the frame memory 108 in this way, the amount of vertical linear noise is detected, and correction data for the vertical linear noise is created and stored in the frame memory unit 108. After that, a readout pulse for the first field is output to read out image signals in the first field. In the case of carrying out this readout for the first field, the correction data for the vertical linear noise is read out from the frame memory unit 108 to carry out processing for subtraction from the read out image signals of the first field, and the subtraction result is written into the frame memory unit 108. The same processing is carried out for a second field and a third field, thereby carrying out the correction of images with vertical linear noises.

FIGS. 5A to 5E are diagrams illustrating an example of an image before and after the vertical linear noise correction processing. In the case of carrying out the vertical linear noise correction processing, high speed sweep before reading out image signals is stopped. Thus, an image is produced with vertical linear noises uniform on the top and bottom of the screen as shown in FIG. 5A. FIG. 5B is an image which represents the uncorrected image of FIG. 5A with the vertical linear noises for each field. In the first embodiment, the image for each field is 1/3 with respect to the final image size, because image signals of the image sensor 102 are divided into three fields and read out every third line as described above. It is to be noted that in the case of carrying out readout from multiple fields other then three fields or in the case of carrying out frame readout, the vertical size of each image is 1/the number of fields (the number of fields=1 in the case of frame readout) with respect to the final image size.

FIG. 5C is a diagram illustrating an example of a dummy image. Since no readout pulse for the pixels is output in the dummy field, a basic image will be a black image. However, even without any pixel information, charge is transferred in the vertical transfer CCDs 102b, and the dummy image also has vertical linear noises caused as shown in FIG. 5C. Since the vertical linear noises have the same signal levels as those of vertical linear noises in the case of reading out the images for each field, correction data (FIG. 5D) for the vertical linear noises is created from this dummy image. The data of the correction values is created by averaging the values of pixels in a predetermined region of the dummy image in the vertical direction to obtain a vertical linear noise detection value. Therefore, the vertical size of the dummy image is preferably as large as possible in order to improve the accuracy of the vertical linear noise detection.

The thus obtained correction data is subtracted from each of the uncorrected images for each field shown in FIG. 5B with the vertical linear noises, thereby allowing vertical linear noise correction to be carried out. FIG. 5E shows an image subjected to the vertical linear noise correction.

Next, the black subtraction processing will be described. FIG. 4B shows a timing chart in the case of the black subtraction processing in the first embodiment. First, for an exposure period, accumulated charge in the image sensor 102 is cleared by the electronic shutter after the output of a readout pulse, and main exposure is started. Then, after a lapse of a predetermined period of time, depending on the shutter speed of the mechanical shutter of the imaging optical system 101, a pulse for closing the shutter is output to close the mechanical shutter, thereby completing the exposure for the image sensor 102.

After that the operation for high speed sweep is carried out, a readout pulse for the first field is output to read out image signals in the first field, and the image signals are written into the frame memory unit 108. The same operations are carried out for the second field and the third field.

After that, in order to acquire a black image, charge is accumulated with the mechanical shutter closed for the same charge accumulation period as the exposure period in the case of main shooting. After the completion of the charge accumulation period, in the same way as in the case of main shooting, high speed sweep is carried out, and a readout pulse for the first field is output to read out a black image in the first field.

Then, processing is carried out for subtraction of the first field of the black image from the first field of the main image stored in advance in the frame memory unit 108, and the subtraction result is again written into the frame memory unit 108. The same series of processing is carried out for the second field and the third field, thereby carrying out black subtraction processing.

Next, processing for shooting in the first embodiment will be described with reference to a flowchart in FIG. 6.

The system control unit 106 opens the mechanical shutter which is included in the imaging optical system 101 and serves as an aperture, depending on the aperture value in accordance with photometric data stored in the internal memory of the system control unit 106 or in the memory unit 113 (step S11), and starts exposure for the image sensor 102 (step S12).

Next, it is determined in accordance with a flash flag whether light supplement with the use of a flash, not shown, is required or not (step S13), and if it is necessary, the flash is turned on to emit light (step S14), or if it is not necessary, the processing proceeds to step S15 without turning the flash on to emit light.

The system control unit 106 waits for the completion of exposure for the image sensor 102 in accordance with the photometric data (step S15), and closes the mechanical shutter included in the imaging optical system 101 (step S16). Then, the system control unit 106 acquires the determined shutter speed and sensitivity A, and the temperature t measured by the thermistor 115 (step S17). Based on the results acquired, it is determined whether or not to carried out the vertical linear noise correction processing or the black subtraction processing, with reference to a correction selecting table stored in the internal memory (not shown) of the system control unit 106 as shown in FIGS. 3A and 3B (step S18).

From the detection results in step S17, if the normal readout processing is selected in accordance with the correction selecting table in step S18, the processing proceeds to step S19 in which the operation of reading out normal image signals is carried out. Alternatively, if the vertical linear noise correction processing is selected, the processing proceeds to step S21 in which the vertical linear noise correction processing is carried out, or if the black subtraction processing is selected, the processing proceeds to step S26 in which the black subtraction processing is carried out.

In the case of the normal readout processing, first, the image sensor 102 is subjected to high speed sweep to sweep unnecessary charge (step S19). After that, charge signals are read out from the image sensor 102, and transmitted to and processed in the analog signal processing unit 103, the ADC unit 104, and the signal processing unit 105 to obtain image signals, and the image signals is written into the frame memory unit 108 (step S20).

In the case of the vertical linear noise correction processing, without transferring accumulated charge from the image sensor 102, a dummy image is read out through processing in the analog signal processing unit 103, the ADC unit 104, and the signal processing unit 105, and written into the frame memory unit 108 (step S21). It is to be noted that high speed sweep for the image sensor 102 is not carried out in the case of reading out the dummy image.

Next, the amount of vertical linear noise is detected (step S22). For the detection of the amount of vertical linear noise, the values of pixels in a predetermined region of the dummy image are averaged for vertical direction to obtain a vertical linear noise detection value for each horizontal line to create correction data.

Next, images of image signals of a main image are read out sequentially from the first field (step S23). In this case, high speed sweep for the image sensor 102 is not carried out. In addition, the vertical linear noise correction processing is carried out by reading out the main image while subtracting the correction data generated in step S22 from the main image data, and the images undergone the vertical linear noise correction are written into the frame memory unit 108 (step S24).

In the case of the black subtraction processing, first, high speed sweep is carried out in the image sensor 102 to sweep unnecessary charge (step S25), and a normal image is then read out for each frame and stored in the frame memory unit 108 (step S26). After that, since it is necessary to read out a black image accumulated for the same exposure period as in the case of the last main shooting, charge accumulation is started with the shutter closed (step S27), with waiting kept until the completion of the same charge accumulation period as the exposure period for the main shooting (step S28). After the completion of the charge accumulation period, high speed sweep is carried out (step S29), and a black image is then read out from the image sensor 102 sequentially for each frame (step S30).

Then, while reading out from the frame memory the main image stored in the frame memory unit 108 in step S26, the main image is subjected to black subtraction processing in which the black image of the corresponding frame, read out in step S30, is subtracted from the main image, and stored again in the frame memory unit 108 (step S31).

When a shot image is completed on the frame memory 108 in accordance with any one of step S20, step S24, and step S31, processing for development is sequentially carried out in accordance with a determined shooting mode (step S32), and the processed image data is written into the frame memory unit 108.

As described above, according to the first embodiment, appropriate processing is selected from the normal readout processing, the vertical linear noise correction processing, and the black subtraction processing unit, depending on the shutter speed s, the sensitivity A, and the temperature t, and vertical linear noises can be thus reduced without degrading the image quality.

It is to be noted that the image sensing apparatus according to the present invention is not to be considered limited to image sensing apparatuses which has the configuration shown in FIGS. 1 and 2, and the procedures of the vertical linear noise correction processing and black subtraction processing differ depending on the configuration of the image sensor 102 and on the method for readout from the image sensor 102. Accordingly, without limitation to the methods described above for the vertical linear noise correction processing and the black subtraction processing, known methods may be used to carry out the vertical linear noise correction processing and the black subtraction processing, depending on the configuration of the apparatus.

<Second Embodiment>

Next, a second embodiment of the present invention will be described. In the first embodiment described above, a correction selecting table based on the dark current estimated from the temperature, shutter speed, and sensitivity of the image sensing apparatus is used to select any one of the normal readout, the vertical linear noise correction, and the black subtraction processing on the basis of the detected temperature, shutter speed, and sensitivity.

However, the dark current caused in the image sensor 102 varies for each image sensor 102. Therefore, the start of the vertical linear noise correction or the start of the black subtraction processing needs to be hasten in view of the variations for the dark current in the image sensor 102 in the case of the creation of the correction selecting table, thus resulting in accelerated degradation of image quality.

Thus, in the second embodiment, in order to eliminate the influence of variations for dark current in the image sensor 102, the dark current is actually measured during operation of a digital camera, and any one of the normal readout processing, the vertical linear noise correction processing, and the black subtraction processing is selected on the basis of the measured value.

Figure 7:
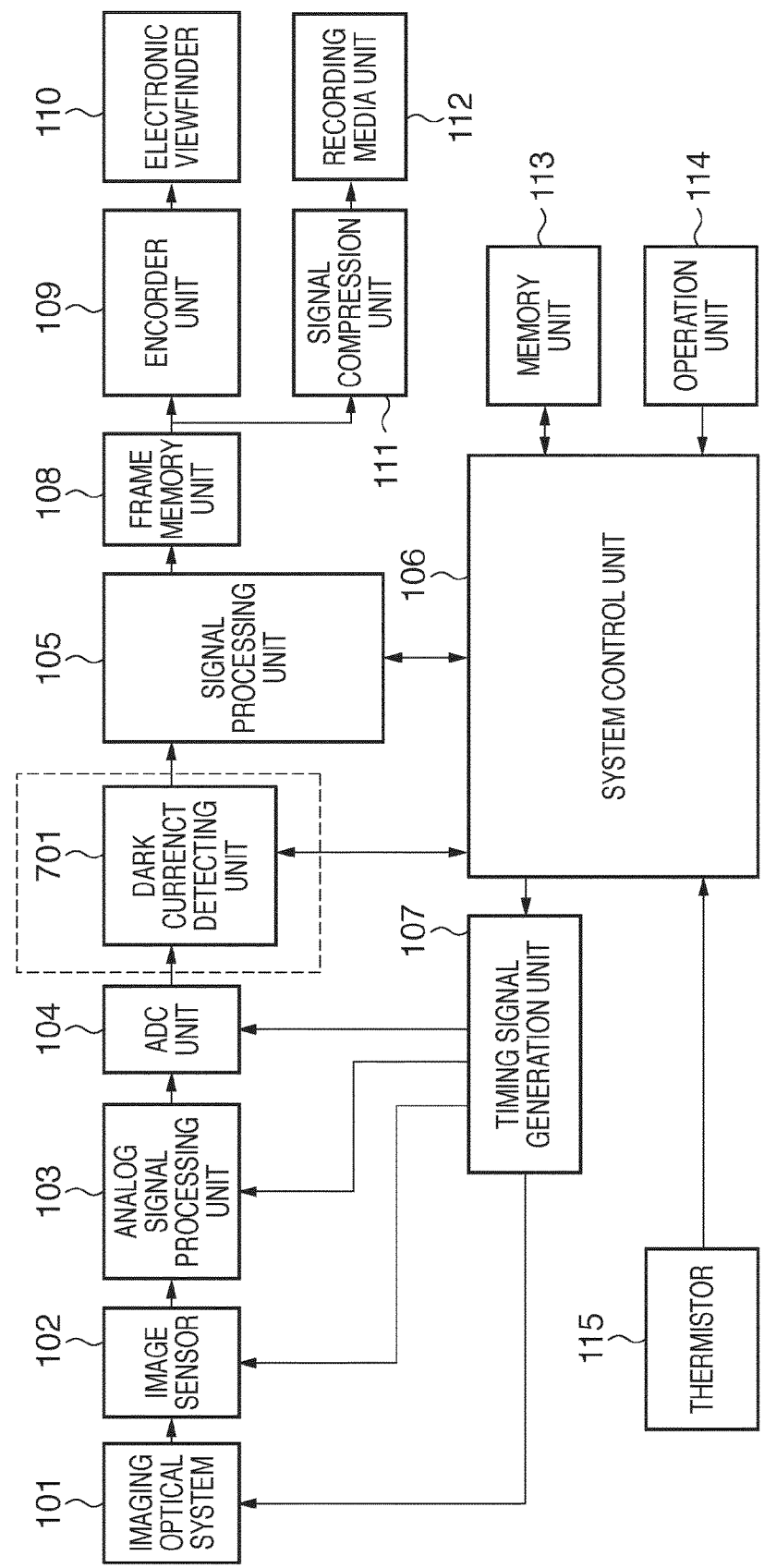
FIG. 7 is a block diagram illustrating the configuration of an image sensing apparatus according to a second embodiment of the present invention.

FIG. 7 is a block diagram illustrating the configuration of a digital camera according to the second embodiment. While FIG. 7 is different from FIG. 1 in that a dark current detecting unit 701 is provided between an ADC unit 104 and a signal processing unit 105, the other configuration is the same as that in FIG. 1. Thus, the same reference numerals are assigned to the same elements, and the descriptions of the elements will be omitted.

Typically, the optical black pixels 102d of the image sensor 102 shown in FIG. 2 are used as pixels to serve as the basis of a black level. In addition, there is no difference in structure between the optical black pixels 102d and the other pixels, except that the optical black pixels 102d are shielded from light. Therefore, dark current is also caused in the same way as in the other pixels. Accordingly, the dark current detecting unit 701 detects dark current from image signals of the optical black pixels 102d in the image sensor 102. In the second embodiment, among image signals acquired in a drive mode before still image shooting, for example, in the case of driving in an EVF (electronic viewfinder) mode, the standard deviation is calculated for the image signals output from the optical black pixels 102d. The calculated standard deviation is determined as a detection value of dark current (dark current value $\sigma 1$). The detected dark current value $\sigma 1$ is stored in an internal memory of the system control unit 106.

Figure 8:
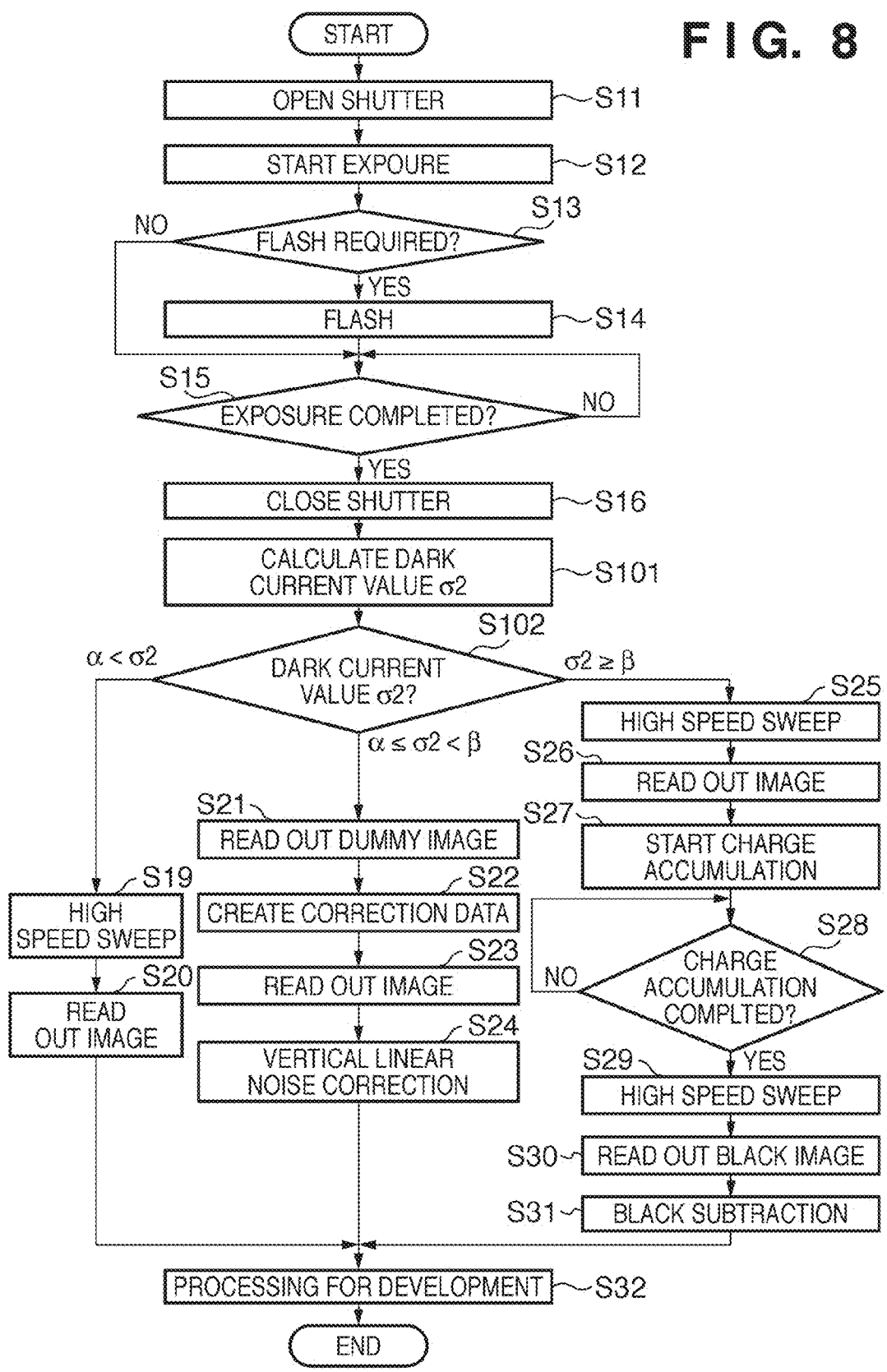
FIG. 8 is a flowchart which shows processing according to the second embodiment.

Next, processing for shooting in the second embodiment will be described with reference to a flowchart in FIG. 8. It is to be noted that the same step number is assigned to the same processing in FIG. 8 as the processing shown in FIG. 6, and the description of the processing will be appropriately omitted.

After the completion of exposure (step S15), the system control unit 106 closes a mechanical shutter (step S16), and calculates a dark current value $\sigma 2$ expected in the main shooting from the dark current value $\sigma 1$ detected during the operation of the EVF (step S101). The dark current value $\sigma 2$ is obtained from the following calculation formula (1).

$$\sigma 2 = \sigma 1 \times s/s' \times A/A' \qquad (1)$$

In the formula (1), s is a shutter speed in the case of main shooting, s' is a shutter speed in the case of operating in the EVF mode, A is a sensitivity in the case of main shooting, and A' is a sensitivity in the case of operating in the EVF mode. More specifically, the dark current value $\sigma 1$ detected during the operation in the EVF mode is multiplied by the ratios of the shutter speed and sensitivity in the case of main shooting to the shutter speed and sensitivity in the case of operating in the EVF mode to obtain the dark current value $\sigma 2$ in the case of main shooting.

Then, in step S102, if the dark current value $\sigma 2$ is $\sigma 2 < \alpha$, it is determined that the dark current component is low, and the processing will proceed to step S19 to read out normal image signals. If the dark current value $\sigma 2$ is $\alpha \leq \sigma 2 < \beta$, it is determined that dark current causes vertical linear noises, and the processing will proceed to step S21 to carry out the vertical linear noise correction processing for image signals read out. If the dark current value $\sigma 2$ is $\sigma 2 \geq \beta$, there will be notedly not only vertical linear noises but also fixed pattern noises of the pixels themselves, and the processing will thus proceed to step S25 to carry out the black subtraction processing for image signals read out. In these cases, $\alpha$ and $\beta$ are threshold values for the dark current value, and the minimum value of the dark current component is determined as $\alpha$, at which a vertical linear noise mainly caused by the dark current component of the vertical transfer CCD 102b starts to appear on the image and requires the vertical linear noise correction. The minimum value of the dark current component is determined as $\beta$, at which both a vertical linear noise mainly caused by the dark current component of the vertical transfer CCD and a fixed pattern noise mainly caused by the dark current component of the pixel start to appear on the image and requires the black subtraction processing.

Figure 6:
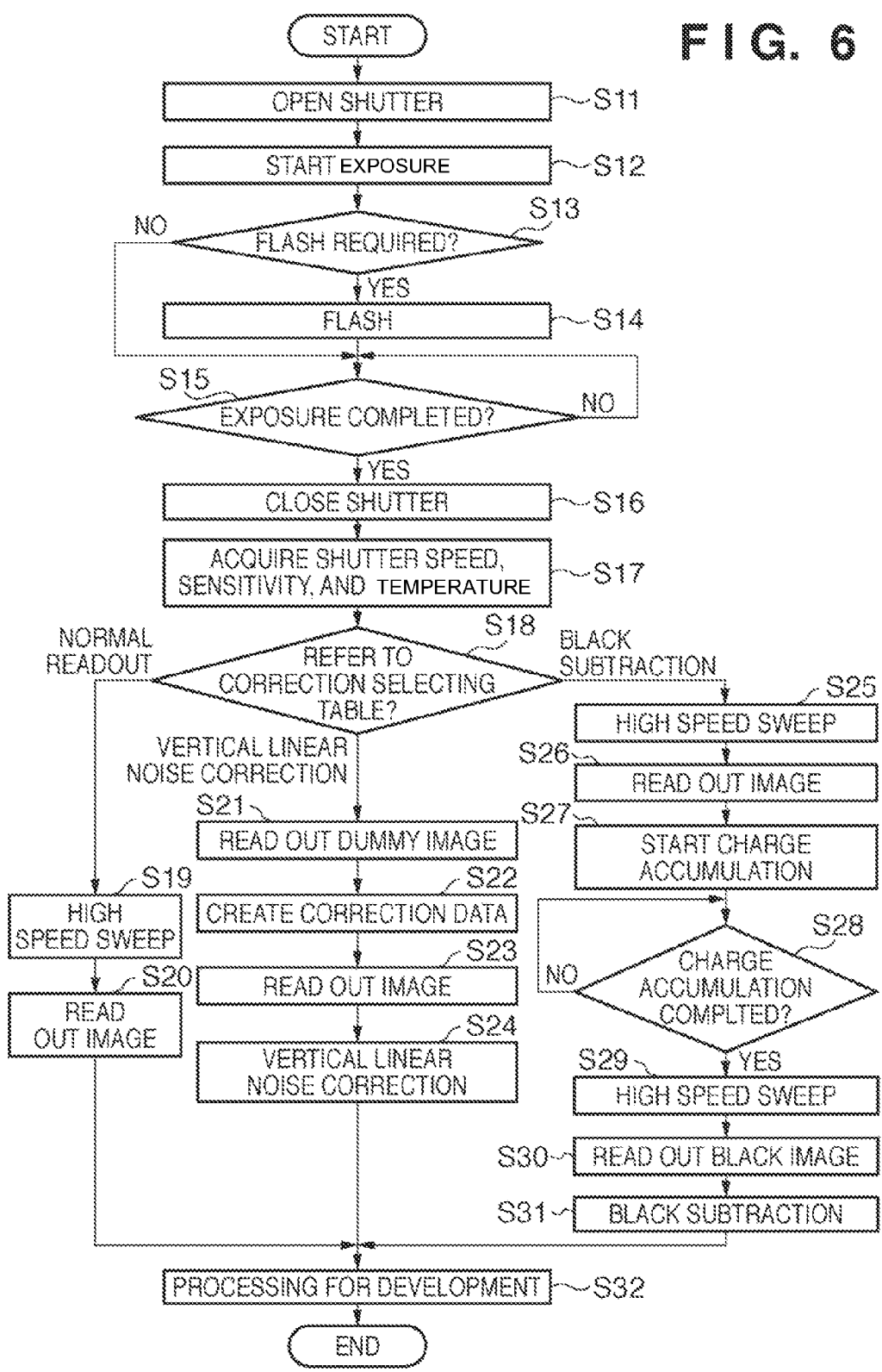
FIG. 6 is a flowchart which shows processing according to the first embodiment.

Subsequent to Step S19, processing is carried out in accordance with the procedure described in the first embodiment with reference to the flowchart in FIG. 6.

As described above, according to the second embodiment, appropriate processing is selected from the normal readout processing, the vertical linear noise correction processing, and the black subtraction processing unit, depending on the dark current value obtained from the outputs of the optical black pixels, and vertical linear noises can be thus reduced without degrading the image quality.

While the drive mode before still image shooting is the EVF mode in the second embodiment, an AF mode for bringing a subject into focus or an EF mode for photometry may be used. More specifically, image signals of an image read out prior to a currently read image can be used.

<Third Embodiment>

Figure 9:
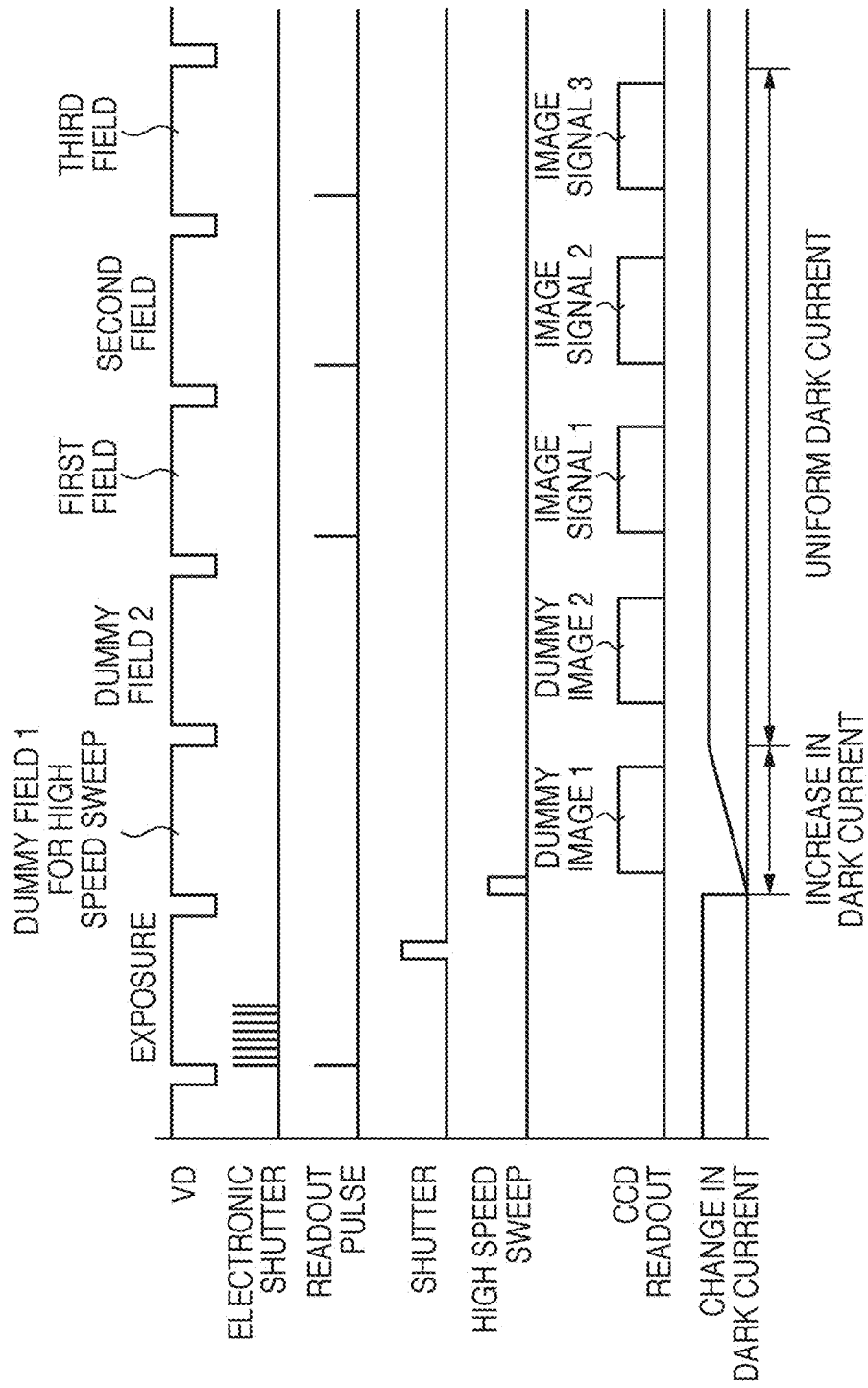
FIG. 9 is a timing chart showing readout timings of image signals in the case of vertical linear noise correction being performed according to a third embodiment.

Next, a third embodiment according to the present invention will be described. In the first and second embodiments described above, no high speed sweep is carried out in the case of carrying out the vertical linear noise correction. However, unless the high speed sweep is carried out, smear will be caused when a high-luminance subject is shot. Therefore, in the third embodiment, a dummy field 1 for high speed sweep is added before reading out a dummy image, as shown in a timing chart of FIG. 9. Thus, after the completion of an exposure period for an image sensor 102, the high speed sweep once eliminates unnecessary charge such as a smear component.

After that, in order to make vertical liner noises uniform on the top and bottom of the screen, transfer is executed in the vertical transfer CCDs 102b for the period of the dummy field 1 for high speed sweep until moving to the next dummy field 2. This operation makes vertical liner noises in a dummy image 2 and image signals 1 to 3 uniform on the top and bottom of the screen, as shown in FIGS. 5B and 5C, and the detection of the vertical linear noises from the dummy image 2 allows the vertical linear noise correction described in the first embodiment.

It is to be noted that black subtraction is carried out in the same way as in the first embodiment. In addition, the processing in FIG. 6 or 8 can be applied for switching among the normal readout processing, the vertical linear noise correction processing, and the black subtraction processing.

<Fourth Embodiment>

Next, a fourth embodiment of the present invention will be described. In the first and second embodiments described above, a dummy image is used for the creation of a correction value for vertical linear noise correction, without reading out any charge from the pixels. On the other hand, in the fourth embodiment, a correction value for vertical linear noise correction is detected from a black image rather than the dummy image.

Figure 10:
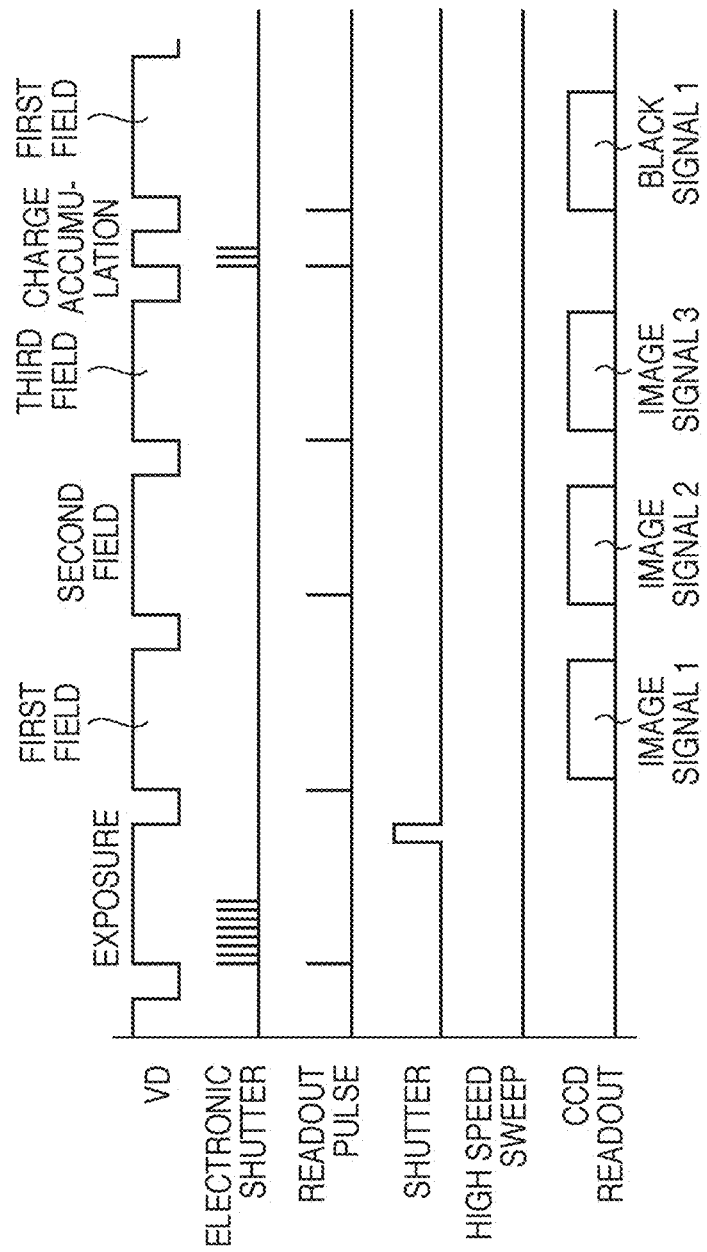
FIG. 10 is a timing chart showing readout timings of image signals in the case of vertical linear noise correction being performed according to a fourth embodiment.
Figure 11A:
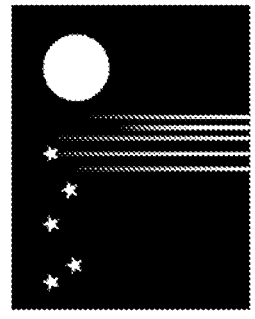
FIGS. 11A to 11C are diagrams for explaining a correction method in a conventional example.
Figure 11B:
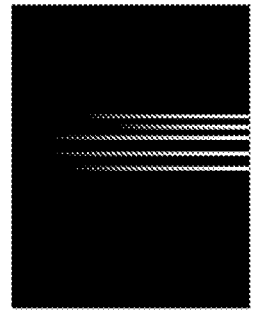
Figure 11C:
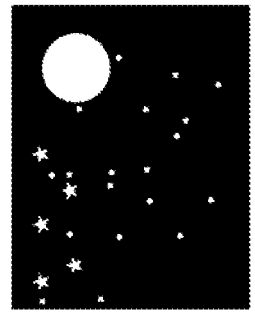

In addition, in the case of vertical linear noise correction, a black image is read out only in the first field, while no black image is read out in the second or third field. Detailed operation will be described below with reference to a timing chart in FIG. 10.

First, for an exposure period, accumulated charge in the image sensor 102 is cleared by an electronic shutter after the output of a readout pulse, and main exposure is started. Then, after a lapse of a predetermined period of time, depending on the shutter speed of a mechanical shutter of an imaging optical system 101, a pulse for closing the shutter is output to close the mechanical shutter, thereby completing the exposure for the image sensor 102.

After that, a readout pulse for the first field is output to read out image signals in the first field, and the image signals are written into the frame memory unit 108. The same operations are carried out for the second field and the third field.

After that, in order to acquire a black image, charge is accumulated with the mechanical shutter closed. However, since the dark current component of the vertical CCD, which is a main cause for vertical linear noises, does not depend on the accumulation period, there is no need to set the same exposure period as the period in the case of main shooting, and the exposure period is thus set to the shortest accumulation period.

After the completion of the accumulation period, a readout pulse for the first field is output to read out black image signals in the first field, and the black image signals are written into the frame memory unit 108. After writing the black image signals into the frame memory unit 108, the amount of vertical linear noise is detected to create correction data for the vertical linear noise. For the detection of the amount of vertical linear noise, the average value for pixels in a predetermined region of the black image signals is acquired as a vertical linear noise detection value for each horizontal line to create the correction data. Then, the created correction data is subtracted from the image signals of the first to third fields obtained by the main shooting, which are stored in the frame memory unit 108, thereby creating a corrected image with the vertical linear noise corrected.

It is to be noted that, in the case of detecting a vertical linear noise from a black image in the fourth embodiment, for the purpose of suppressing dark current components caused on a pixel to pixel basis, the vertical size of the black image is preferably as large as possible in order to improve the accuracy of the vertical linear noise detection.

As described above, according to the fourth embodiment, the use of a black image allows the vertical linear noise correction processing to be carried out without specially switching to dummy image readout. In addition, the circuit size such as the electrode structure (not shown) in the image sensor 102 can be reduced to simplify the control sequence of firmware.

It is to be noted that black subtraction is carried out in the same way as in the first embodiment. In addition, the processing in FIG. 6 or 8 can be applied for switching among the normal readout processing, the vertical linear noise correction processing, and the black subtraction processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-260452, filed on Nov. 13, 2009 which is hereby incorporated by reference herein in its entirety.

What is claimed is:

1. An image sensing apparatus comprising:
an image sensor configured to convert an optical image of a subject into image signals by photoelectric conversion, the image sensor comprising a plurality of pixels two-dimensionally arranged, a vertical transfer unit for transferring, in a vertical direction, image signals from the plurality of pixels, and a horizontal transfer unit for transferring, in a horizontal direction, image signals transferred in the vertical direction from the vertical tranfer unit;
a control unit configured to exercise control in such a way that information is acquired for estimating a magnitude of a dark current in the image sensor; any one of vertical linear noise correction processing, black subtraction processing, or normal readout processing in which neither the vertical linear noise correction processing or the black subtraction processing is carried out, is selected on the basis of the acquired information; and the vertical linear noise correction processing is carried out to correct a vertical linear noise in an image in the case of selecting the vertical linear noise correction processing, or the black subtraction processing is carried out to correct a vertical linear noise and a fixed pattern noise in an image in the case of selecting the black subtraction processing,
wherein the control unit exercises control in such a way that a number of times high speed sweep is carried out for the vertical transfer unit is smaller in a case where the vertical linear noise correction processing is carried out than in a case where the black subtraction processing is carried out.

2. The image sensing apparatus according to claim 1, wherein the control unit acquires a temperature, a shutter speed, and a sensitivity of the image sensor as the information, holds a table for relating the information to processing contents, depending on the magnitude of an estimated black current, and selects any one of the black subtraction processing, the vertical linear noise correction processing, and the normal readout processing in accordance with the table.

3. The image sensing apparatus according to claim 1, wherein the image sensor further comprises a plurality of optical black pixels shielded from light,
the control unit acquires, as the information, a first shutter speed and a first sensitivity for acquiring currently read first image signals, optical black pixel signals output from the optical black pixels from among second image signals read out from the image sensor prior to reading out the first image signals, and a second shutter speed and a second sensitivity for acquiring the second image signals, and
a standard deviation for the acquired optical black pixel signals is multiplied by the ratios of the first shutter speed and the first sensitivity to the second shutter speed and the second sensitivity to estimate a magnitude of a dark current in the case of reading out the first image signals.

4. The image sensing apparatus according to claim 1, wherein the control unit exercises control in such a way that high speed sweep is carried out for the vertical transfer unit in the normal readout processing or the black subtraction processing, and high speed sweep is not carried out for the vertical transfer unit in the vertical linear noise correction processing.

5. The image sensing apparatus according to claim 1, wherein to carry out the vertical linear noise correction processing, empty transfer is executed in the vertical transfer unit to read out signals without transferring image signals from the pixels to the vertical transfer unit, correction data is generated for correcting a vertical linear noise on the basis of the read signals, and the correction data is subtracted from the image signals read out from the pixels.

6. The image sensing apparatus according to claim 5, wherein in the vertical linear noise correction processing, high speed sweep for the vertical transfer unit is carried out prior to the empty transfer.

7. The image sensing apparatus according to claim 1, wherein, to carry out the vertical linear noise correction processing, the pixels are exposed to light to acquire image signals and then shields the pixels from light to acquire black image signals, correction data is generated for correcting a vertical linear noise on the basis of the black image signals, and the correction data is subtracted from the image signals read out from the pixels.

8. A method for controlling an image sensing apparatus comprising an image sensor configured to convert an optical image of a subject into image signals by photoelectric conversion, the image sensor comprising a plurality of pixels two-dimensionally arranged, a vertical transfer unit for transferring, in a vertical direction, image signals from the plurality of pixels, and a horizontal transfer unit for transferring, in a horizontal direction, image signals transferred in the vertical direction from the vertical transfer unit, the method comprising:
an acquisition step of acquiring information for estimating a magnitude of a dark current in the image sensor;
a selection step of selecting, on the basis of the acquired information, any one of vertical linear noise correction processing, black subtraction processing, or normal readout processing in which neither the vertical linear noise correction processing or the black subtraction processing is carried out;
a vertical linear noise correction processing step of carrying out the vertical linear noise correction processing to correct a vertical linear noise in an image if the vertical linear noise correction processing is selected in the selection step; and
a black subtraction processing step of carrying out the black subtraction processing to correct a vertical linear noise and a fixed pattern noise in an image if the black subtraction processing is selected in the selection step,
wherein the control unit exercises control in such a way that a number of times high speed sweep is carried out for the vertical transfer unit is smaller in a case where the vertical linear noise correction processing is carried out than in a case where the black subtraction processing is carried out.

* * * * *